US012337548B2

(12) United States Patent
Visconti et al.

(10) Patent No.: US 12,337,548 B2
(45) Date of Patent: Jun. 24, 2025

(54) METHOD AND EQUIPMENT FOR THE INTEGRATION OF CONTINUOUS J SHAPED SPARS IN EXTENDED PANELS OF COMPOSITE MATERIAL

(71) Applicant: LEONARDO S.P.A., Rome (IT)

(72) Inventors: Marco Visconti, Turin (IT); Gianni Iagulli, Turin (IT)

(73) Assignee: LEONARDO S.P.A., Rome (IT)

( * ) Notice: Subject to any disclaimer, the term of this patent is extended or adjusted under 35 U.S.C. 154(b) by 129 days.

(21) Appl. No.: 18/036,566

(22) PCT Filed: Nov. 12, 2021

(86) PCT No.: PCT/IB2021/060515
§ 371 (c)(1),
(2) Date: May 11, 2023

(87) PCT Pub. No.: WO2022/101848
PCT Pub. Date: May 19, 2022

(65) Prior Publication Data
US 2024/0009939 A1    Jan. 11, 2024

(30) Foreign Application Priority Data
Nov. 13, 2020   (IT) .................... 102020000027287

(51) Int. Cl.
*B29C 70/44*   (2006.01)
*B29C 65/00*   (2006.01)
(Continued)

(52) U.S. Cl.
CPC ............ *B29C 66/474* (2013.01); *B29C 65/02* (2013.01); *B29C 65/48* (2013.01);
(Continued)

(58) Field of Classification Search
CPC .................. B29C 70/44; B29C 65/78
See application file for complete search history.

(56) References Cited

U.S. PATENT DOCUMENTS 4,492,607 A * 1/1985 Halcomb .............. B29C 70/083
156/247
8,657,984 B1 * 2/2014 Williams ........... B29D 99/0014
156/245
(Continued)

FOREIGN PATENT DOCUMENTS

| CN | 104290336 | 1/2015 |
| EP | 1231046 | 8/2002 |
| EP | 3640485 | 4/2020 |

OTHER PUBLICATIONS

International Search Report and Written Opinion in corresponding International Patent Application No. PCT/IB2021/060515, mailed Mar. 10, 2022 (17 pages).
(Continued)

*Primary Examiner* — Jeffry H Aftergut
(74) *Attorney, Agent, or Firm* — Leason Ellis LLP

(57) ABSTRACT

A method for the integration of continuous J shaped spars in extended panels of composite material in which J shaped spars are each arranged on a rectilinear support having at least one right triangle shaped portion, and the spars carried by the respective rectilinear supports are subsequently arranged on a stratified structure carried by a mould. A vacuum bag is created which covers the stratified structure, the rectilinear supports, and the J shaped spars. Holes are created in the vacuum bag at respective connection points made along each rectilinear support. A supporting structure provided with hooking and adjusting elements with the connection points adjusts the position of each hooking and adjusting element with respect to the supporting structure in order to position the rectilinear support in a direction parallel
(Continued)

to the vertical so that the position of the end portion of the J shaped spar, with respect to the mould, corresponds to that foreseen by the design.

10 Claims, 4 Drawing Sheets

(51) Int. Cl.
    *B29C 65/02*     (2006.01)
    *B29C 65/48*     (2006.01)
    *B29C 65/78*     (2006.01)
    *B29C 70/54*     (2006.01)
    *B29K 105/24*     (2006.01)

(52) U.S. Cl.
    CPC ...... *B29C 65/7802* (2013.01); *B29C 65/7841* (2013.01); *B29C 66/1122* (2013.01); *B29C 66/721* (2013.01); *B29C 66/73752* (2013.01); *B29C 66/81455* (2013.01); *B29C 70/44* (2013.01); *B29C 70/541* (2013.01); *B29K 2105/246* (2013.01)

(56) References Cited

U.S. PATENT DOCUMENTS

2016/0346995 A1    12/2016    Butler et al.
2018/0086429 A1*    3/2018    Sheppard .................. B64C 9/00

OTHER PUBLICATIONS

International Preliminary Report on Patentability in corresponding International Patent Application No. PCT/IB2021/060515, mailed Sep. 13, 2022 (9 pages).

* cited by examiner

METHOD AND EQUIPMENT FOR THE INTEGRATION OF CONTINUOUS J SHAPED SPARS IN EXTENDED PANELS OF COMPOSITE MATERIAL

CROSS-REFERENCE TO RELATED APPLICATIONS

This patent application is a U.S. National Phase Application under 35 U.S.C. § 371 of International Patent Application No. PCT/IB2021/060515, filed on Nov. 12, 2021, which claims priority from Italian patent application no. 102020000027287, filed on Nov. 13, 2020, all of which are incorporated by reference, as if expressly set forth in their respective entireties.

OBJECT OF THE INVENTION

The present invention relates to a method and equipment for the integration of continuous J shaped spars in extended panels of composite material.

BACKGROUND OF THE INVENTION

Aeronautical structures must, by intrinsic necessity, be designed and manufactured according to criteria of minimum weight and, like all products intended for the market, minimum manufacturing cost, both in terms of recurring and non-recurring costs.

With the advent of advanced carbon fibre composite materials (CFCs), which can be cut, laminated and polymerized according to very different geometries and anyway optimized for the specific requirements of the engineering design, significantly lightened aeronautical structures have been developed with respect to those manufactured with traditional materials, e.g. metallic materials.

Moreover, composite materials are well suited to the manufacturing of highly integrated components (i.e. sub-assemblies made up of several parts manufactured together and joined to each other without the need of mechanical assembling) such as co-cured multi-spar structures also with leading and trailing edges made in a single block; structures stiffened by integral longitudinal ribs in a single block.

Integrating the elements that constitute the primary structure, i.e. making a structural element "a single block" by means of the integration of the load-bearing components of the structure such as outer panels, ribs or stiffening ribs and spars (also with subsequent thermal cycles in autoclaves), allows having the advantages listed below in terms of weight, performance and cost of the manufactured product:

Improvement of the structural capacities through a diffused distribution (continuous element) instead of a punctual distribution (connecting members) of the stresses induced in the structure by the aerodynamic loads transiting between several elements (precisely by eliminating the joint);

Reduction in the number of parts (weight and recurring manufacturing cost/management of elements);

Reduction in the number of the lamination and polymerization equipment, with respect to the non-integrated traditional configuration, thus lower non-recurring costs;

Reduction in connecting members (weight and installation cost of connecting members);

Improvement of the aerodynamic performance of the integrated structural element: by eliminating the connecting members, the drillings/countersinks (necessary for their installation) are avoided, thus eliminating gaps/steps and misalignments between the head of the connecting member and the counterbore which cause a deterioration of the aerodynamic surface and a consequent increase in fuel consumption;

Improvement of the sealing capacity (for example, of the fuel in the so-called 'wet wing', or of the cabin pressure for fuselages) in terms of reduction in sealants between the parts and connecting members.

All this while observing the stringent tolerances of the aeronautical product, which are invariably in the order of a few tenths of a millimetre, both in the aerodynamic profiles and in the reciprocal positioning of the structural parts (for example, the positioning of the spar(s) with respect to the outer panels of a typical wing structure and/or of tail or control surfaces).

All these possible optimizations and innovations of the Aeronautical Product are in conflict more often than not with the limits typical of the proposed technological solutions and of the required equipment for their implementation. In fact, in order to manufacture such manufactured articles made of advanced composite in an integrated manner, equipment is required that is capable of maintaining the parts in the correct positions under the vacuum bag (technology typically used to make the components in consideration) during the polymerization or curing/solidification cycle of the composite material, which is carried out in an autoclave with the application of specific heating cycles involving temperatures in the order of 180-200° C., as well as the application of external pressure of approximately 3-8 atmospheres, and the approximately absolute vacuum seal inside the bag applied to the material (all necessary during the polymerization in an autoclave in order for the material to be free of defects such as the incorrect cross-linking of the resin, the chemical-physical and structural properties that do not comply with the specifications, porosity or voids).

It is thus necessary to introduce constraining "strong points" (also called "combs" or "rakes") in the aforementioned equipment for the reciprocal positioning of parts which, in their preformed but not yet polymerized state, must be positioned under the bag; these strong points must ensure the position during the aforementioned thermal cycle (which is very stressful from the structural point of view for the equipment) and at the same time they must allow the vacuum bag to distribute the pressure of the autoclave uniformly on the part, and this both to ensure the correct polymerization of the resin of the composite material and to avoid unbalances of forces that can induce displacements and/or geometric and morphological deformations in the parts in the curing step.

Moreover, this equipment must not "disturb" the thermal cycle in an autoclave, i.e. it cannot be placed directly on the part to be polymerized because it creates a "pressure shadow" thereon, which generates porous areas in the composite material and thus of waste during the thermal cycle. Such equipment must meet conflicting requirements, namely: 1) be positioned so as not to create undercuts or pressure shadows with respect to the parts to be integrated and polymerized, 2) support the preformed but not yet solidified components, under the vacuum bag, while maintaining the reciprocal positions in a precise manner in the order of a few tenths of a millimetre, 3) not interfere with, compromise or damage the vacuum bag applied to the material to be polymerized, 4) resist mechanically and with limited elastic deformation the foreseen temperature and pressure cycles for the polymerization of the composite material, 5) have a very high flexural rigidity in order to be able to support with a maximum deflection in the order of tenths of a millimetre the extended, preformed but not yet polymerized components, when this equipment is rested/constrained at the distance of the strong points (which must be outside the piece) which represent their positioning constraint. To date, integration equipment of the structural composites such as for example spars with a span greater than 2.5 metres or having a longer length without solution of continuity, i.e. without intermediate supporting strong points (the latter solution requiring the interruption of the component to be integrated and the need for the part on which the equipment rests to already be pre-polymerized) is unknown for structural applications.

Document No. EP 1.232.046 describes an example of the known art.

The aim of the method forming the object of the present invention is to solve the problems listed above in that it relates to a method for the integration of J shaped spars in extended panels of composite material of the type described in the appended claims.

DESCRIPTION OF THE PREFERRED EXAMPLE EMBODIMENT

The main steps of the method of the present invention will now be summarized.

First Step, Lamination

Figure 1:
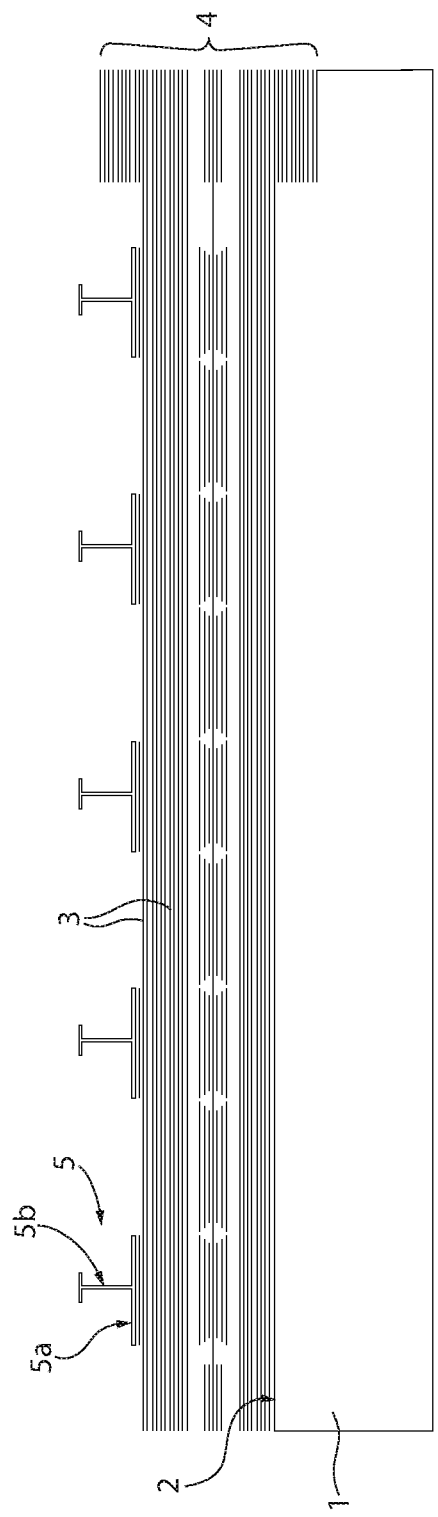
FIGS. 1 and 2 illustrate a first and a second step of the method of the present invention.

A mould 1 is used (FIG. 1, the mould is represented schematically in cross-section), which defines a resting surface 2 on which a plurality of layers of composite material 3, in particular pre-impregnated carbon fibre, are laminated. The mould 1 copies the aerodynamic profile of the component to be made (for example, a portion of a wing) and is made of metallic or composite material that has minimum thermal expansions so as not to cause deformations or geometric distortions to the component during a subsequent thermal cycle. The mould 1 can be made of a plurality of different materials among which composite material or INVAR™ steel. The lamination operations are carried out automatically by means of a laminating head (of a known type and not illustrated) which moves with respect to the mould and using known technologies. This creates a stratified structure 4 that has a different thickness, in particular a greater thickness, at the areas that will have to support greater loads in use, for example the end portions.

Second Step, Arrangement of the T Elements

Figure 2:
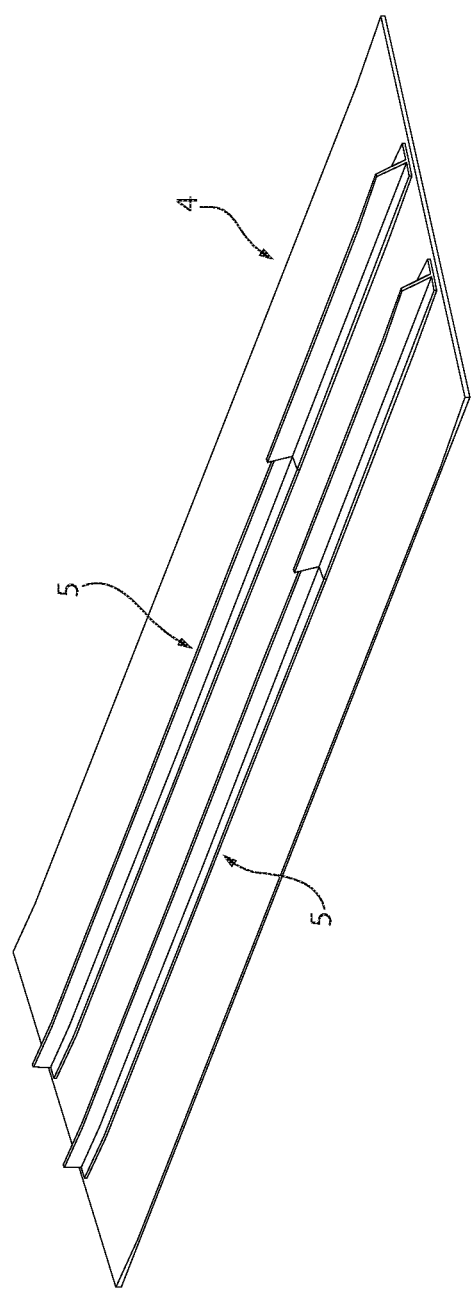

Subsequently (FIGS. 1 and 2), a series of longitudinal stiffenings (ribs) 5 with a T shaped cross-section and made of pre-impregnated composite material are arranged on the stratified structure 4. The T shaped longitudinal stiffenings (ribs) 5 are arranged with the almost flat rectangular portion 5a in contact with the outer wall of the stratified structure 4 and therefore have a rectilinear portion 5b substantially transverse to the resting plane of the stratified structure 4. The T shaped longitudinal stiffenings (ribs) 5 are manufactured using known technologies. The T shaped longitudinal stiffenings (ribs) 5 can be arranged by a robotized apparatus or manually.

Third Step, Arrangement of the Vacuum Bag

Figure 3:
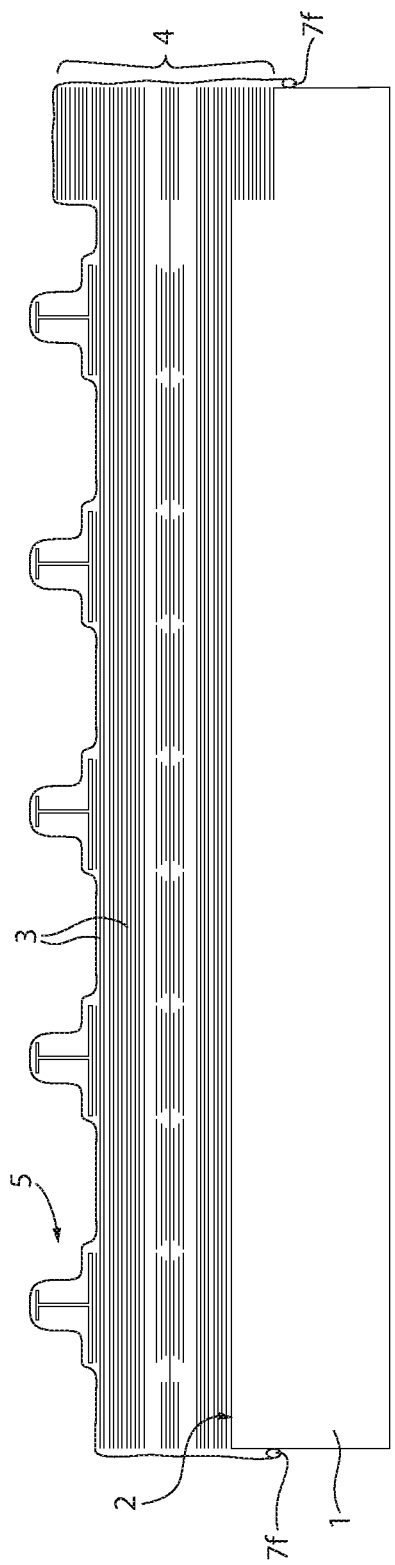
FIG. 3 illustrates a third step of the method of the present invention.

Then (FIG. 3), a vacuum bag 6 made at the time of use is arranged so as to cover the stratified structure 4 and the longitudinal stiffenings (ribs) 5 and sealed directly on the mould 1 (the sealing areas between the vacuum bag 6 and the periphery of the mould 1 are indicated by 7f). The vacuum bag 6 is depressurized by means of known techniques and the mould 1 is placed in an autoclave to carry out a high-temperature and high-pressure cycle that achieves the polymerization as required by the technical specifications of the material constituting the stratified structure 4 and the longitudinal stiffenings (ribs 5) that are firmly connected to each other thanks to the cross-linking of the resin of the composite material or of any interposed structural adhesives (not illustrated for the sake of simplicity).

Fourth Step, Creation of J Shaped Spars

The process (FIG. 4a-4f) consists of the following subsequent moulding steps.

Thermoforming (FIG. 4a) by means of known art a preform of composite material in sheet 7 on a C shaped mould S1 so that this has a C shape comprising a flat central portion 8 and two bent lateral edges 9a, 9b which extend from the same side of the flat central portion 8 and are pressed against lateral faces of the mould S1.

Thermoforming (FIG. 4b) by means of known art a preform of composite material in sheet 10 on a mould S2 so that this has a Z shape comprising a flat central portion 11 and two lateral edges 12a, 12b which extend from opposite sides of the flat central portion 11 with different inclinations with respect to the flat central portion 11.

Removing (FIG. 4c) a part $S_k$ of the mould S2 so that a free lateral edge 12b of the Z shaped preform is no longer supported by the removed portion $S_k$ and therefore by the mould S2.

Figure 5:
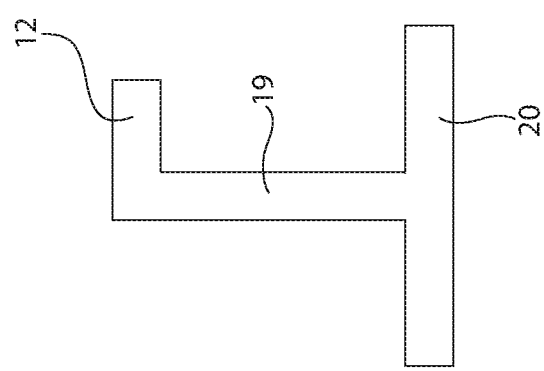
FIG. 5 illustrates a spar manufactured according to the method of the present invention.

Overturning (FIG. 4d) the mould S2 in order to arrange the central portion 11 in contact with the central portion 8 with respective first edges 9b and 12a still carried by the respective moulds S1 and S2 (FIG. 4d); the central portions 8 and 11 come into contact with one another and will create, after their polymerization, the central portion 19 of the spar (FIG. 5).

Figure 4C:
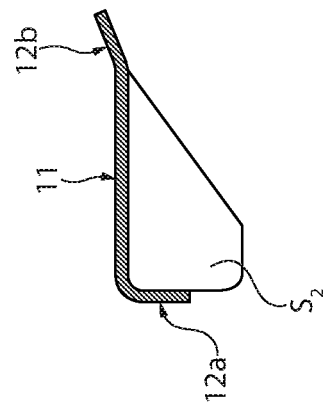
FIG. 4 illustrates a fourth step of the method of the present invention.
Figure 4B:
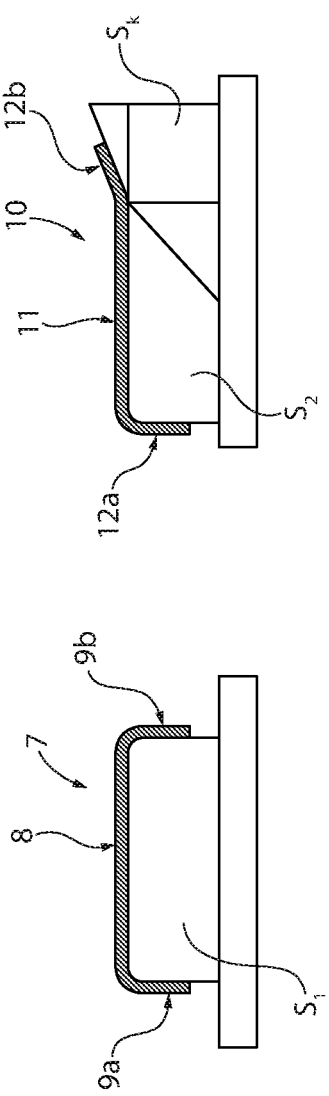
Figure 4A:
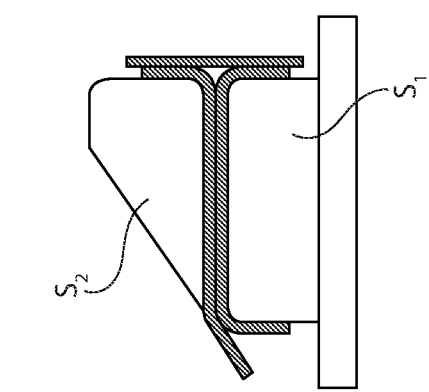
Figure 4F:
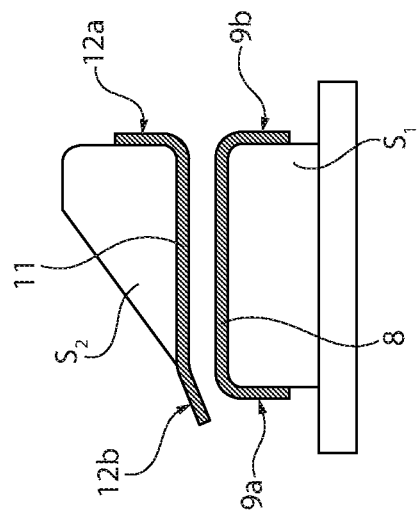
Figure 4E:
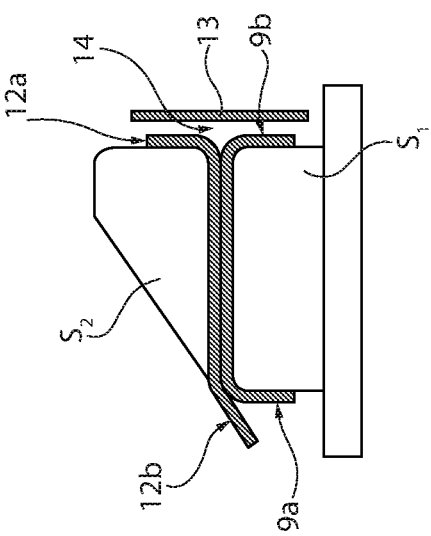
Figure 4D:
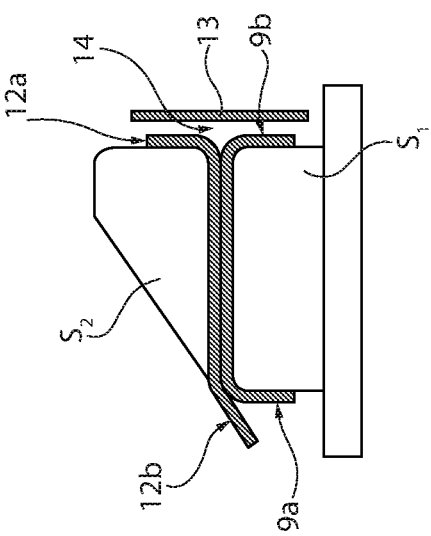

Arranging a pseudotriangular shaped filler 14 at the contact zone of the first edges 9b and 12a and a strip of preimpregnated material 13 to cover the first edges 9b and 12a (FIG. 4e). The first edges 9b and 12a and the preimpregnated material 13, after their polymerization, will create the base 20 of the J shaped spar (FIG. 5).

Bending the free edge 12b on the edge 9a supported by the mould S1 creating the J shaped spar (FIG. 4e) by applying heat and the known art. The overlapped edges 12b and 9a in this operation, after their polymerization, will create the end appendix 12 of the J shaped spar.

The application of heat and concurrent pressure or vacuum during the abovementioned moulding step gives the assembly a geometric stability in shape that is suitable for the subsequent moving and handling steps, the above though must occur without damaging, even partially, the polymerization of the resin (FIG. 4f), therefore the moulds S1 and S2 can be removed thus creating the preformed J shaped spar (FIG. 5).

The J shaped spar thus comprises a flat rectangular extended central portion 19, a flat rectangular base portion 20 transverse to the extended central portion 19 and extending from a central portion of the latter and an end appendix 12 extending from a side of the extended central portion 19 in parallel to the base portion 20.

Fifth Step Arrangement of the Spars on Supports

Each J shaped spar (FIG. 6) is typically arranged manually and/or by a robot on a rectilinear support 25 having at least one right triangle shaped portion so that the central portion 19 of the spar is arranged to come into contact with the larger base side $L_B$ of the support 25, the end appendix 12 rests on the right side $L_R$ of the support 25 and the base 20 of the spar is free and facing downwards.

According to the invention of the present patent, the support 25 will be carried by a supporting structure 30 arranged above the mould 1 and connected with the rectilinear support 25 by a plurality of hooking and adjusting elements 31 each extending from the supporting structure 30 to the right side portion $L_R$ of the rectilinear support 25 in a direction parallel to the vertical.

Figure 6:
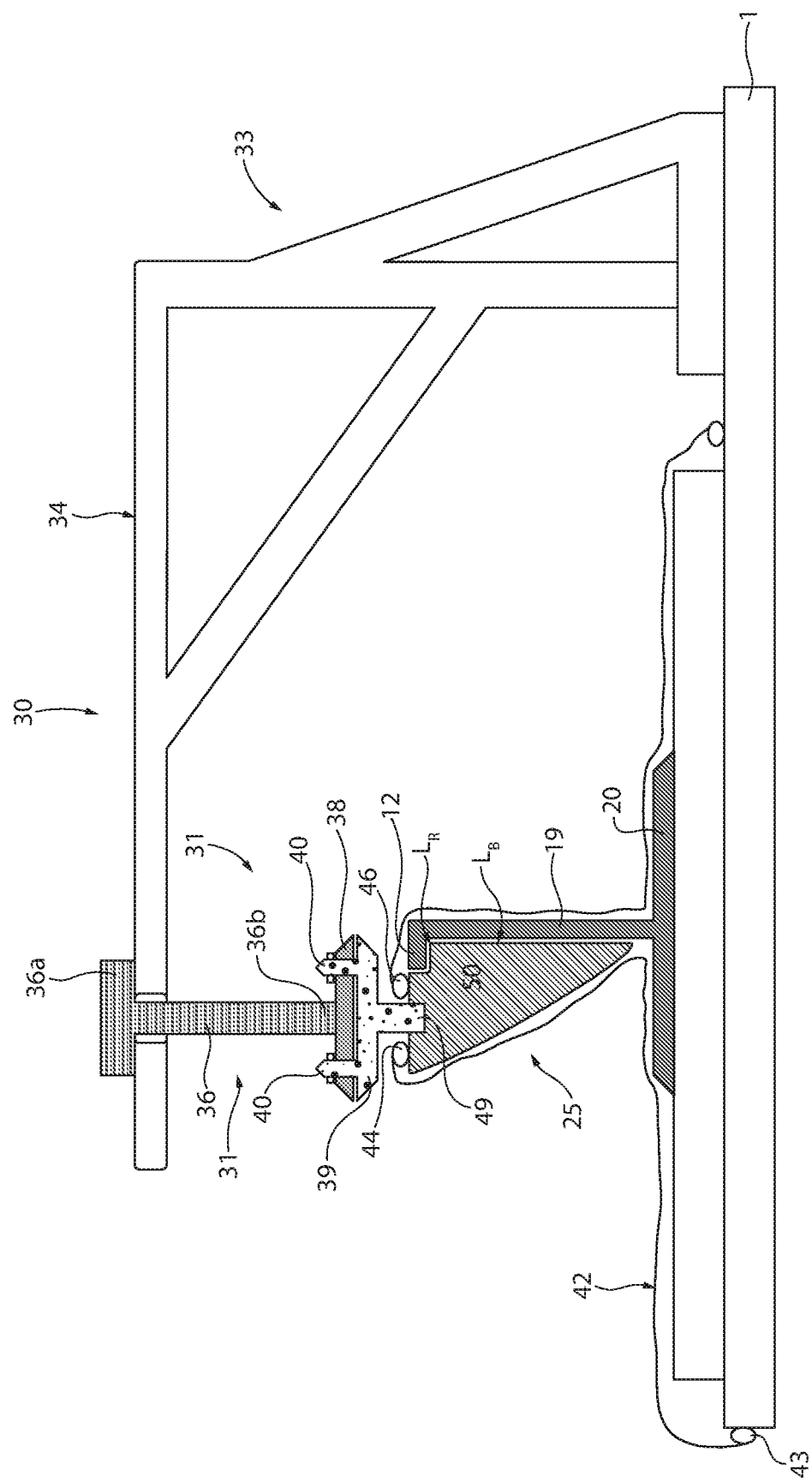
FIG. 6 illustrates a fifth step of the method of the present invention and further steps.

The supporting structure 30 illustrated in FIG. 6 comprises a vertical truss 33 from which a horizontal supporting structure 34 extends cantilevered, which carries the hooking elements 31.

In the illustrated example, the hooking and adjusting elements 31 comprise a threaded or sliding rod 36 which has an upper portion 36a coupled with a nut or linear guide 37 carried by the horizontal supporting structure 34 and a lower portion 36b connected with an upper plate 38, which in turn is provided with arched through slots. The upper plate 38 is in turn connected to a lower plate 39 by means of a series of threaded pins 40 which passing through the aforementioned slots of the upper plate 38 are tightened with nuts. Said pins 40 are integrated in the lower plate 39, which also comprises a threaded appendix 49 which is coaxial to the rod 36 and couplable with the nut made in a blind hole 50 which opens on the right side of the rectilinear support 25. Each rectilinear support 25 is provided along its length with a plurality of holes 50 spaced apart from one another which function as connection points with the hooking and adjusting elements 31.

The supporting structure 30 can also be more advantageously made with a gantry configuration (not illustrated for the sake of simplicity), i.e. with the horizontal support 34 constrained at both its ends to symmetrical vertical trusses 33. For the sake of simplicity, the drawing illustrates a single rectilinear support 25, the supporting structure 30 is configured to carry a plurality of the same.

Sixth Step: Loading the Supports with the J Shaped Spars on Panel

The triangular supports 25 (each including the supported J shaped spar) not yet carried by the supporting structure 30 are placed on the already polymerized panel 4 so that the base 20 of the J shaped spar comes into contact with the panel 4; a layer of adhesive (not illustrated) is interposed between said base and the panel 4.

The supports 25 (already comprising the J shaped spars) are placed and engaged with end combs of a known type, which are not illustrated for the sake of simplicity.

Seventh Step: Creation of the Vacuum Bag

A vacuum bag 42 closed with a sealing seam of mastic 43 is created manually on the polymerization mould 1 along all of the peripheral areas external to the panel 4. The vacuum bag 42, created using known art such as the lamination of films or layers of flexible, ventilation-separating materials and of gas-impermeable nylon, covers the entire part to be sent into the autoclave for the polymerization, and specifically the panel 4, the longitudinal stiffenings 5 (not illustrated for the sake of simplicity in FIG. 6), the support 25 and the base portion 20, the central portion 19 and the end portion of the J shaped spar.

Subsequently, a hole F is made in the vacuum bag 42 at each threaded blind hole 50 on the right side of the rectilinear support 25 where the hooking with the appendix 49 is subsequently carried out, which is sealed with sealing seam 44 46 arranged in a toroidal or circular manner on said right side around the threaded blind hole 50.

The vacuum bag 42 covers the oblique side of the rectilinear support 25 and is adapted by means of the known art of clamps at the lower concave radii of the J shaped spar which connect the base 20 and the central portion 19 of the same. This operation is repeated for all J shaped spars present.

Eighth Step: Indexing and Positioning the Supporting Structure on the Mould, Hooking the Rectilinear Support and Adjusting the Position of the Rectilinear Support The supporting structure 30 is positioned on the mould 1, in an area external to the vacuum bag 42, and is firmly connected to the mould 1 by means of reference pins and secured on the mould 1 with threaded pins (not illustrated).

For each blind hole 50 of the rectilinear support 25, the appendix 49 is screwed into the blind hole 50 establishing a constraint between the rectilinear support 25 and the lower plate 39.

Subsequently, the rod 36 is lowered by rotation or sliding until the upper plate 38 engages with the lower plate 39 by means of the passing of the threaded pins integrated in the plate 39 through the respective through slots provided on the plate 38.

An adjustment step is then performed by tightening the nuts on the pins 40, which work together to bring the plates 38 and 39 closer together and raise the rectilinear support 25 until the plates come into contact and the position of the support corresponds to the correct position foreseen by the construction drawings.

The hooking and adjusting elements 31 of the equipment make up for the natural gravity-induced bending of the rectilinear support 25 by bringing the portion 12 of the spar to a nominal height and profile and ensure the maintenance of the theoretical position even during the polymerization cycle in the autoclave. There is in fact a plurality of hooking and connecting elements that keep the spar in position over the entire length of the rectilinear support.

The adjusting step can be repeated several times: for example, every two metres of length of the support 25 so as to stabilize its position and thus, as a consequence, the position of the appendix 12 of the J shaped spar.

The adjustment of the height of the appendix 12 with respect to the vertical (Z axis) is carried out thanks to the prior calibration of the position of the sliding or threaded rod 36, thanks to the calibration of the end position of the appendix 49 in the threaded blind hole 50 and by means of the complete tightening of the nuts on the integrated pins 40 that bring the connection surfaces of the plates 38 and 39 into full contact.

In this manner, with this hooking outside the vacuum bag, the position of the rectilinear support 25 (and consequently the J shaped spar and its upper appendix 12) is stabilized with a clear improvement in the quality of the part and, above all, the overcoming of the limit in length (about 2.5 m between one support and the following one) of the known solutions.

As a consequence, the rectilinear support 25 can be more slender and thus lighter, more manageable and less expensive.

Ninth Step Final Polymerization

The vacuum bag 42 is depressurized and the entire assembly including the supporting structure 30 is arranged in an autoclave in order to perform a polymerization cycle of the resin and of any adhesive. In this manner, the J shaped spars solidify and firmly adhere to the stratified structure.

Alternative Embodiments

The third step may be absent. In this case, the J shaped spars are placed on a stratified structure 4 yet to be polymerized. The longitudinal T shaped stiffenings (ribs) 5 are not polymerized either. The eighth step concurs to polymerize all the resin (co-curing).

The second step may be absent. In this manner, the longitudinal T-shaped stiffenings (ribs) 5 are not created (where structurally unnecessary) and the J shaped spars are placed on a stratified structure 4. The eighth step concurs to polymerize the resin of the spars and to bring about the bonding/integration to/into the panel 4, obtaining a component with only the J shaped spars (co-bonding).

The second and third steps may be absent. In this case, the longitudinal T shaped stiffenings (ribs) 5 are not created (where structurally unnecessary) and the J shaped spars are placed on a stratified structure 4. The eighth step concurs to polymerize all the resin (co-curing).

The invention claimed is:

1. A method for the integration of continuous J shaped spars in extended panels of composite material comprising the following steps:
laminating a plurality of layers of resin impregnated composite material on a polymerization mould that defines a resting surface and copies an aerodynamic profile of a component to be made thus creating in this manner a stratified structure that has a greater thickness at areas that will have to support greater loads in use;
creating J shaped spars of composite material; each spar comprises an extended central portion, a base portion transverse to the extended central portion and an end appendix extending from a side of the extended central portion;
arranging each J shaped spar on a rectilinear support having at least one right triangle shaped portion so that the extended central portion of the spar is arranged to come into contact with a larger base side $L_B$ of the rectilinear support, the end appendix rests on a portion on a right side $L_R$ of the support and the base of the spar is free and facing downwards;
arranging the spars, carried by the respective rectilinear supports, on the stratified structure;
creating a vacuum bag closed with sealing seam on the polymerization mould along all peripheral areas external to the panel; the vacuum bag covers the stratified structure, the rectilinear support, the base portion, the central portion and the end portion of the J shaped spars;
creating holes in the vacuum bag at respective connection points made along each rectilinear support, each hole being surrounded by a sealing zone which maintains a tight seal of the vacuum bag;
coupling a supporting structure positioned on the mould, in an area external to the vacuum bag and provided with a plurality of hooking and adjusting elements with said mould;
connecting each hooking and adjusting element with a connection point;
adjusting a position of each hooking and adjusting element with respect to the supporting structure in order to position the rectilinear support in a direction parallel to the vertical so that a position of the end portion of the J shaped spar, with respect to the mould, corresponds to that foreseen by a design; and
depressurizing the vacuum bag and arranging the polymerization mould and the supporting structure in an autoclave to perform a polymerization cycle of the resin impregnated composite material and any adhesive so that the J shaped spars firmly solidify and adhere to the stratified structure in the position foreseen by the design.

2. The method according to claim 1, wherein a step of arranging a series of longitudinal stiffenings made with preimpregnated composite material on the stratified structure is provided.

3. The method according to claim 2, wherein after the step of arranging a series of longitudinal stiffenings made with preimpregnated composite material on the stratified structure, the following steps are then performed:
arranging a further vacuum bag to cover the stratified structure and the longitudinal stiffenings;
depressurizing the further vacuum bag and arranging the polymerization mould in an autoclave to perform the polymerization of the material forming the stratified structure and the longitudinal stiffenings which firmly connect to one another by cross-linking the resin impregnated composite material or any interposed structural adhesives.

4. The method according to claim 1, wherein said step of laminating is performed automatically by a laminating head which moves with respect to the polymerization mould.

5. The method according to claim 2, wherein said longitudinal stiffenings have a T shaped cross-section and are arranged with an almost flat rectangular portion in contact with an outer wall of the stratified structure and therefore have a rectilinear portion substantially transverse to a plane of rest of the stratified structure.

6. The method according to claim 3, wherein said further vacuum bag is sealed directly on the polymerization mould.

7. The method according to claim 1, wherein said step of creating a J shaped spar of composite material comprises the following steps:
thermoforming a preform of composite material in sheet on a C shaped first mould S1 so that this has a C shape comprising a flat central portion and two bent lateral edges which extend from the same side of the flat central portion and are pressed against lateral faces of the C shaped first mould (S1);

thermoforming a preform of composite material in sheet on a second mould S2 so that this has a Z shape comprising a flat central portion and two lateral edges which extend from opposite sides of the flat central portion;

removing a part $S_k$ of the second mould S2 so that a free lateral edge of the Z shaped preform is no longer supported by the removed portion $S_k$ and therefore by the second mould S2;

overturning the second mould S2 in order to arrange the central portion carried by the second mould S2 in contact with the central portion carried by the C shaped first mould S1 with respective first edges still carried by the respective first and second moulds S1 and S2; the central portions come into contact with one another and will create, after their polymerization, said central portion of the spar;

arranging a pseudotriangular shaped filler at the contact zone of the first edges and a strip of preimpregnated material to cover the first edges; the first edges and the preimpregnated material, after their polymerization, will create the base of the J shaped spar;

bending the free edge on a second edge supported by the C shaped first mould S1 creating the J shaped spar by applying heat; overlapped edges in this operation, after their polymerization, will create the end appendix of the J shaped spar.

8. The method according to claim 1, wherein the hooking and adjusting elements comprise a threaded or sliding rod which has an upper portion coupled with a nut or linear guide carried by a horizontal supporting structure and a lower portion connected with an upper plate connectable with a lower plate by a series of threaded pins that pass through slots of the upper plate and are tightened with nuts; said lower plate also comprises a threaded appendix couplable with a nut made in a blind hole which creates the connection point.

9. The method according to claim 1, wherein said supporting structure and the relative hooking and adjusting elements do not interfere with the vacuum bag necessary for the polymerization of the component, as they extend externally to the same and directly hook to the rectilinear support, that supports the J shaped spar, at a plurality of vacuum tight connection points, arranged on the rectilinear support and at which the vacuum bag is perforated and the relative edges sealed with sealing seam arranged toroidal or circular on a right side of the support around the connection points.

10. The method according to claim 1, wherein the resin impregnated composite material comprises carbon fibre.

* * * * *